US007488929B2

(12) United States Patent
Townley-Smith et al.

(10) Patent No.: US 7,488,929 B2
(45) Date of Patent: Feb. 10, 2009

(54) PERIMETER DETECTION USING FIBER OPTIC SENSORS

(75) Inventors: Paul A. Townley-Smith, Irvine, CA (US); Scott Hellman, Aliso Viejo, CA (US); John Kondis, Costa Mesa, CA (US); Eliseo Romolo Ranalli, Irvine, CA (US)

(73) Assignee: Zygo Corporation, Middlefield, CT (US)

( * ) Notice: Subject to any disclaimer, the term of this patent is extended or adjusted under 35 U.S.C. 154(b) by 325 days.

(21) Appl. No.: 10/918,807

(22) Filed: Aug. 13, 2004

(65) Prior Publication Data

US 2005/0077455 A1 Apr. 14, 2005

Related U.S. Application Data

(60) Provisional application No. 60/494,724, filed on Aug. 13, 2003.

(51) Int. Cl.
*G01J 1/04* (2006.01)
*G01J 4/00* (2006.01)

(52) U.S. Cl. .............................. 250/227.14; 250/227.18

(58) Field of Classification Search ................................ 250/227.14–227.18, 227.23, 227.24, 227.11, 250/227.19, 227.27, 231.11, 216; 340/555–557, 340/540, 541, 552, 665, 666; 356/32–35.5, 356/450, 477, 478, 482, 73.1; 385/12, 13
See application file for complete search history.

(56) References Cited

U.S. PATENT DOCUMENTS

| | | | | | |
|---|---|---|---|---|---|
| 4,840,481 | A | * | 6/1989 | Spillman, Jr. | 356/32 |
| 5,118,931 | A | * | 6/1992 | Udd et al. | 250/227.16 |
| 5,426,297 | A | * | 6/1995 | Dunphy et al. | 250/227.23 |
| 5,680,489 | A | * | 10/1997 | Kersey | 385/15 |
| 5,684,297 | A | * | 11/1997 | Tardy | 250/227.14 |
| 5,698,848 | A | * | 12/1997 | Belk | 250/227.11 |
| 5,748,312 | A | * | 5/1998 | Kersey et al. | 356/478 |
| 5,754,293 | A | * | 5/1998 | Farhadiroushan | 356/478 |
| 5,757,487 | A | * | 5/1998 | Kersey | 356/478 |
| 5,798,834 | A | * | 8/1998 | Brooker | 356/477 |
| 5,987,197 | A | * | 11/1999 | Kersey | 385/24 |
| 6,049,506 | A | * | 4/2000 | White | 356/451 |
| 6,097,487 | A | * | 8/2000 | Kringlebotn et al. | 356/450 |
| 6,204,920 | B1 | * | 3/2001 | Ellerbrock et al. | 356/477 |
| 6,212,306 | B1 | * | 4/2001 | Cooper et al. | 385/12 |

(Continued)

OTHER PUBLICATIONS

Avanex Corporation, “Power Filter™ 100 GHz Single Channel DWDM Components” brochure, “http://www.avanex.com/Products/datasheets/Multiplexing/PwrFilter.100DWDM.Comp.pdf” 2004.

(Continued)

*Primary Examiner*—Georgia Y Epps
*Assistant Examiner*—Pascal M Bui-Pho
(74) *Attorney, Agent, or Firm*—Fish & Richardson P.C.

(57) ABSTRACT

A fiber optic perimeter detection system includes a receiver to receive output light signals from sensors positioned at different regions, each sensor including a sensing fiber. Each sensor generates an output light signal having a specified wavelength, the output light signal having a property that varies when stress is induced in the sensing fiber. The perimeter detection system includes a memory to store information related to a mapping between the wavelengths of the output light signals and the regions where the sensors are positioned.

43 Claims, 6 Drawing Sheets

U.S. PATENT DOCUMENTS

| | | | | |
|---|---|---|---|---|
| 6,285,806 | B1 * | 9/2001 | Kersey et al. | 385/12 |
| 6,489,606 | B1 * | 12/2002 | Kersey et al. | 250/227.14 |
| 6,566,648 | B1 * | 5/2003 | Froggatt | 250/227.14 |
| 6,816,638 | B1 * | 11/2004 | Bennion et al. | 385/13 |
| 6,879,742 | B2 * | 4/2005 | Chi et al. | 385/12 |
| 6,937,151 | B1 * | 8/2005 | Tapanes | 340/550 |
| 7,072,588 | B2 * | 7/2006 | Skinner | 398/171 |
| 2002/0028034 | A1 * | 3/2002 | Chen et al. | 385/12 |
| 2002/0063866 | A1 * | 5/2002 | Kersey et al. | 356/478 |
| 2002/0109081 | A1 * | 8/2002 | Tarvin et al. | 250/227.23 |
| 2002/0154855 | A1 * | 10/2002 | Rose et al. | 385/24 |
| 2003/0072514 | A1 * | 4/2003 | Ames | 385/12 |
| 2004/0067003 | A1 * | 4/2004 | Chliaguine et al. | 385/13 |

OTHER PUBLICATIONS

Fiber SenSys, Inc. "Fiber Defender Model 205 Fiber-Optic Perimeter Security Sensors" brochure, "http://www.fibersensys.com/pdf_2/fd205DataSheet.pdf" 2002.

Fiber Instrument Sales, Inc., "Fiber Optic Security Solutions," brochure "http://www.fiberinstrumentsales.com/FISCatalog/Assets/PDFFiles/ffence.pdf" 2002.

Abacus Optical Mechanics, Inc., "Fiber Optic Sensors," "http://home.earthlink.net/~abacus1/abacus" Aug. 8, 2003.

* cited by examiner

PERIMETER DETECTION USING FIBER OPTIC SENSORS

RELATED APPLICATIONS

This application claims priority to U.S. provisional application Ser. No. 60/494,724, filed on Aug. 13, 2003, entitled "Interferometric Optical Sensor for Use in a Perimeter Detection System," to Paul A. Townley-Smith et al. The content of the provisional application is hereby incorporated herein by reference.

BACKGROUND

This description relates to perimeter detection. Perimeter detection systems are useful in detecting intruders along large perimeters, such as those at airports or military encampments. Airports have authorized entrances that are gate-controlled 24 hours a day, but the airports may be surrounded by undeveloped and unmonitored terrain whose perimeters can be several miles. While many airports use full perimeter chain link fencing, this is not always effective. Many currently available perimeter detection systems are detectable by the intruder and are bulky, and may not be easily deployed or hidden. For example, the intruder can detect the perimeter detection system using methods including visual inspection, radio frequency probe, metal detection, and thermal scanning.

In one example, a perimeter detection system uses a sensing fiber whose optical property varies when stress is induced in the fiber, resulting in a change in the optical signals propagating through the fiber. The sensing fiber is deployed along the perimeter of an area to be monitored. A light source generates an optical signal, which travels the length of the sensing fiber, and is detected by an optical detector. A monitoring station monitors the optical signal detected by the optical detector, and detects changes in the detected signal to determine whether stress is induced in the sensing fiber, indicating that an intruder has stepped on the sensing fiber.

SUMMARY

In one aspect, the invention features a fiber optic perimeter detection system that includes a receiver that receives output light signals from fiber optic sensors positioned at different locations of an area to be monitored. Each sensor includes a sensing fiber, and each sensor generates an output light signal having a specified wavelength, the output light signal having a property that varies when stress is induced in the sensing fiber. The perimeter detection system includes a memory that stores information related to a mapping between the wavelengths of the output light signals and the regions where the sensors are positioned.

Implementations of the invention may include one or more of the following features. The system includes a transmitter to transmit light signals having multiple wavelengths to the sensors. The system includes a display to indicate a change in the one or more conditions in a particular region when there is a change in an output light signal having a wavelength that maps to the particular region. Each of at least a subset of the sensors includes a fiber optic sensor that transmits light having a specified wavelength through the sensing fiber. At least one region has sensing fibers of at least two fiber optic sensors.

The sensing fibers are sensitive to pressure applied to the fibers. Each fiber optic sensor includes a wavelength division multiplexing (WDM) filter that allows a light signal having a specific wavelength to pass. The output light signal of each of at least a subset of the fiber optic sensors includes an interference signal based on an interference of light signals transmitted through the sensing fiber. In one example, the interference signal is based on an interference of light signals transmitted to and reflected from the sensing fiber and a reference fiber, each connected to a reflector. In another example, the interference signal is based on an interference of light signals entering and exiting opposing ends of the sensing fiber. The system includes one or more fiber cables to transmit the light signals from the transmitter to the fiber optic sensors, and to transmit the output light signals from the fiber optic sensors to the receiver. The property of the output light signal includes at least one of a phase and an amplitude of the output light signal.

In another aspect, the invention features a perimeter detection system that includes a fiber optic sensor to generate an interference signal based on two signals, at least one of the signals traveling through a sensing fiber, the interference signal varying in phase and/or amplitude when stress is induced in the sensing fiber. A detector detects the interference signal, and a data processor detects changes in the interference signal.

Implementations of the invention may include one or more of the following features. In one example, the sensor includes a reference fiber, and the interference signal is generated by superimposing a reference signal that traverses the reference fiber and a sensor signal that traverses the sensing fiber. In another example, the interference signal is generated based on an interference of two signals traveling the sensing fiber in opposite directions.

In another aspect, the invention features a perimeter sensing system that includes fiber optic sensors positioned at different regions, each fiber optic sensor including sensing fiber. Each fiber optic sensor generates an output light signal that has a specified wavelength, the output light signal having a property that varies when stress is induced in the sensing fiber. A transmitter transmits light signals having multiple wavelengths to the fiber optic sensors, and a receiver receives the output light signals from the sensors. A memory stores information related to a mapping between the wavelengths of the output light signals and the regions where the fiber optic sensors are positioned. A display indicates a change in the one or more conditions in a particular region when there is a change in an output light signal having a wavelength that maps to the particular region.

Implementations of the invention may include one or more of the following features. Each fiber optic sensor transmits light having a specified wavelength through the sensing fiber. Each fiber optic sensor includes a wavelength division multiplexing filter that allows a light signal having a specific wavelength to pass to an optical coupler that is coupled to the sensing fiber. The output light signal of each of at least a subset of the fiber optic sensors includes an interference signal based on an interference of light signals, at least one of the signals transmitted through the sensing fiber. The system includes fiber cables to transmit light signals from the transmitter to one of the fiber optic sensors, from the fiber optic sensors to the receiver, and from one fiber optic sensor to anther fiber optic sensor. The property of the output light signal includes at least one of a phase and an amplitude of the output light signal.

In another aspect, the invention features a storage medium that includes a database that stores information about a mapping between locations of fiber optic sensors and wavelengths associated with the fiber optic sensors. Each fiber optic sensor is associated with a wavelength, and each fiber optic sensor a sensing fiber. Each fiber optic sensor generates an output that is sensitive to stress induced in the sensing fiber.

Implementations of the invention may include one or more of the following features. The database stores information about the outputs of the fiber optic sensors under various environment conditions. The environment conditions include at least one of temperature, type of soil in the vicinity of the sensing fiber, bury depth of the sensing fiber, and pressure applied to the sensing fiber.

In another aspect, the invention features a perimeter monitoring method that includes sensing physical pressure applied to different regions based on light signals having different wavelengths and on information about a mapping between the wavelengths and the regions.

Implementations of the invention may include one or more of the following features. The method includes sensing the one or more conditions at a region using at least one sensor that is positioned at the region, each sensor generating an output light signal having a specified wavelength, the output light signal having a property that changes when the pressure applied to the region changes. Each of at least a subset of the sensors includes a fiber optic sensor that transmits light having a specified wavelength through a sensing fiber. The method includes, using each fiber optic sensor to generate an interference signal based on an interference of light signals, at least one light signal transmitted through the sensing fiber. In one example, generating the interference signal includes reflecting light signals from reflectors attached to the sensing fiber and a reference fiber. In another example, generating the interference signal includes sending light signals into the sensing fiber through opposing ends of the fiber. The method includes transmitting light signals having multiple wavelengths to the sensors. The method includes, at each fiber optic sensor, filtering the light signals to allow a light signal having a specified wavelength to pass and to reflect the other light signals.

In another aspect, the invention features a perimeter monitoring method that includes generating an interference signal based on two signals, at least one signal traveling through a sensing fiber, the interference signal varying in phase and/or amplitude when stress is induced in the sensing fiber. The method includes detecting the interference signal, and detecting changes in the interference signal.

Implementations of the invention may include one or more of the following features. In one example, the two signals includes a reference signal and a sensor signal, the reference signal traveling a reference fiber that is insensitive to changes in an environment, the sensor signal traveling the sensing fiber that is sensitive to changes in the environment. In another example, the two signals travel along the sensing fiber in opposite directions.

In another aspect, the invention features a perimeter monitoring method that includes sensing one or more conditions using fiber optic sensors that are positioned at different regions, each fiber optic sensor including a sensing fibers and generating an output light signal having a specified wavelength, the output light signal varying when stress is induced in the sensing fiber, in which at least a subset of the sensors each has an output light signal having a wavelength that is different from those of the other sensors in the subset. The method includes receiving the output light signals from the fiber optic sensors, and monitoring the one or more conditions at the different regions based on the output signals from the sensors and on information related to a mapping between the wavelengths of the output light signals and the regions where the sensors are positioned.

Implementations of the invention may include one or more of the following features. Each fiber optic sensor transmits light having a specified wavelength through the sensing fiber. Sensing one or more conditions includes sensing pressure applied to the sensing fiber. The method includes transmitting light signals having multiple wavelengths to the sensors. The method includes, at each fiber optic sensor, filtering the light signals to allow a light signal having a specified wavelength to pass to the sensing fiber and to reflect the other light signals.

In another aspect, the invention features a monitoring method that includes detecting a presence of an object in a protected area by using fiber optic sensors that are positioned at different regions in the protected area, each fiber optic sensor including a sensing fibers and generating an output light signal having a specified wavelength, the output light signal having a property that changes when stress is induced in the sensing fibers, at least a subset of the sensors each having an output light signal with a wavelength that is different from those of the other sensors in the subset.

Implementations of the invention may include one or more of the following features. The method includes receiving the output light signals from the fiber optic sensors, and monitoring the different regions based on the output signals from the sensors and on information related to a mapping between the wavelengths of the output light signals and the regions where the sensors are positioned. The property of the output light signal includes at least one of a phase and an amplitude of the output light signal.

In another aspect, the invention features a method of deploying sensors that includes deploying a fiber optic sensor in an area, the fiber optic sensor including an interferometer that includes a sensing fiber, the interferometer to generate an interference signal having a property that varies when stress is induced in the sensing fiber.

Implementations of the invention may include one or more of the following features. In one example, the interferometer generates the interference signal based on an interference between a first signal propagating a reference path and a second signal propagating a sensor path. In another example, the interferometer generates the interference signal based on an interference between two signals propagating in opposite directions through a sensing fiber.

In another aspect, the invention features a method of deploying sensors that includes deploying multiple fiber optic sensors in an area, each the fiber optic sensor including a filter and a sensing fiber that is sensitive to stress, the filter allowing only light signals having a particular wavelength to be coupled to the sensing fiber to allow that sensor to generate an output signal having the particular wavelength, the output signal having a property that changes in response to stress induced in the sensing fiber, the filters in different sensors allowing light signals having different wavelengths to pass to corresponding interferometers.

Implementations of the invention may include the following feature. The method includes linking the fiber optic sensors using transmit interconnect fibers and receive interconnect fibers, the transmit interconnect fibers to send wavelength division multiplexed signals to each of at least a subset of the sensors, the receive interconnect fibers to receive wavelength division multiplexed signals from each of at least a subset of the sensors.

Embodiments may include a combination of discrete low cost optical elements. Alternatively, in other embodiments, the same functionality may be achieved with planar waveguide technology or other discrete components including fiber Bragg gratings and circulators. The interferometers may involve many different configuration, all of which generally achieve the same result—stress induces phase change and/or birefringence in the fiber, which produces a detectable signal.

Unless otherwise defined, all technical and scientific terms used herein have the same meaning as commonly understood by one of ordinary skill in the art to which this invention belongs. In case of conflict with patent applications incorporated herein by reference, the present specification, including definitions, will control.

Other features, objects, and advantages of the invention will be apparent from the following detailed description.

DETAILED DESCRIPTION

Figure 1:
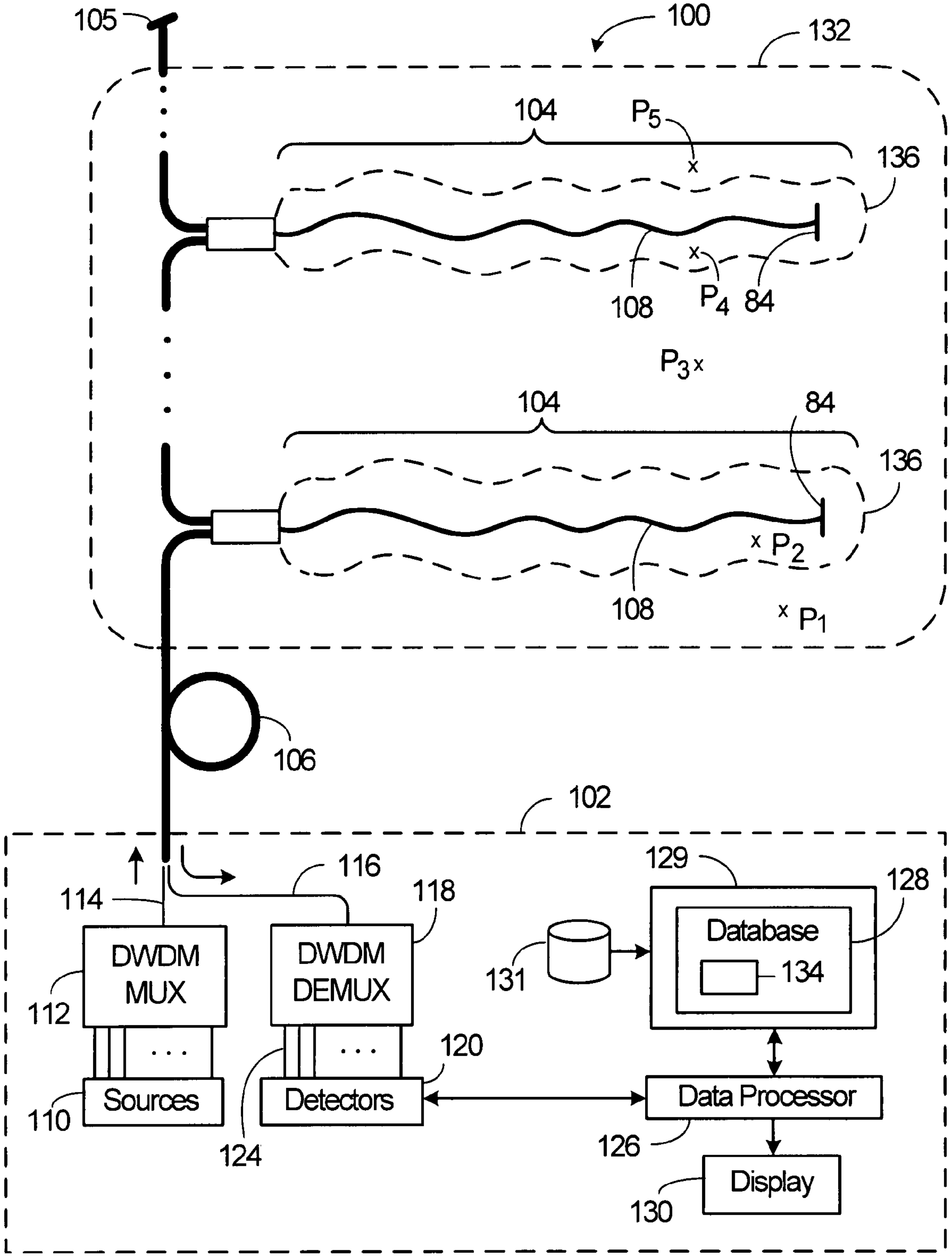
FIG. 1 is a schematic diagram of a fiber-optic perimeter detection system.

Referring to FIG. 1, a fiber optic perimeter detection system 100 includes fiber optic sensors 104 that are deployed at different locations of an area 132 (enclosed in dashed lines) to be monitored. The system 100 includes a monitoring station 102 that sends wavelength division multiplexed (WDM) optical signals through a fiber interconnect cable 106 to the fiber optic sensors 104. Each sensor 104 includes one or more sensing fibers 108 that can detect perturbations resulting from an intruder stepping on the fibers or on the ground near the fibers. The perturbations cause stress in the sensing fiber 108, inducing phase change and/or birefringence in the sensing fiber. The changes in the optical properties of the sensing fibers 108 are detected using an interference technique, which provides a high sensitivity in detection of small perturbations.

The system 100 is configured so that each individual sensor 104 is interrogated independently, using one system wavelength dedicated to each sensor 104. Each fiber optic sensor 104 generates a return signal that is sensitive to stress induced in the sensing fiber 108. The return signal is sent back to the monitoring station 102 through the fiber interconnect cable 106, allowing the station 102 to continuously monitor the return signals from the different sensors 104 to detect changes in the return signals. Based on pre-stored information about the location of each sensor 104 and the wavelength associated with each sensor 104, the monitoring station 102 can determine the location of an intruder when there is a perturbation in a return signal having a particular wavelength.

The monitoring station 102 includes source and detector arrays and a set of multiplexing/demultiplexing hardware. An array of signal sources 110, such as an array of diode lasers each having a slightly different wavelength, generate the optical signals that are sent to the sensors 104. The center wavelengths of the signal sources can be, e.g., defined by the appropriate telecommunications wavelength grid standard. For example, the system 100 can use optical signals in the C-band having wavelengths in the range of 1528 nm to 1555 nm, with a channel spacing of 100 GHz. The optical signals from the signal sources 110 are multiplexed by a dense wavelength division multiplexing (DWDM) multiplexor 112, which transmits the aggregated light signal to a transmit interconnect fiber 114.

At each sensor 104, a DWDM filter de-multiplexes one of the transmitted wavelengths and directs the light towards an interferometer, while the other wavelengths pass through the DWDM filter and continue traveling down the transmit interconnect fiber 114. When the light returns from the interferometer, the DWDM filter multiplexes it onto a receive interconnect fiber 116, which guides the light back to the monitoring station 102.

The last sensor 104 in the chain of sensors is connected to a fiber that has a termination 105 to prevent any remaining light not used by the sensors 104 from coupling back to the system 100. In one example, the fiber terminates with a blackened end having an 8-degree cut to reduce the amount of back reflection.

The receive and transmit interconnect fibers 116 and 114 are included in the interconnect cable 106. The interconnect fibers 114 and 116 are not part of the interferometer (which includes the sensing fiber 108), and thus are orders of magnitude less sensitive to applied stress. This allows the transmissivity of the transmit or receive fibers to remain constant when stress is applied to the sensing fibers 108. Otherwise, a dynamic change in the transmissivity of the transmit or receive fibers would appear as though several sensors were activated simultaneously.

The signals returning to the monitoring station 102 are demultiplexed by a DWDM demultiplexor 118, which directs the return signals having different wavelengths to different fibers 124, each connected to a dedicated optical detector 120. Light traveling to and from sensors 104 farther from the sources 110 and detectors 120 will have a higher loss. This can be compensated by providing a higher power at the sources 110 at the wavelengths associated with the farther sensors, or amplifying the received signals before they are sent to the detectors 120. Post amplification has the advantage of maintaining a lower optical power in the field, which reduces the possibility of an intruder detecting the system 100. The disadvantage of post amplification is that noise added to the return signals are also amplified. The output signals of the detectors 120 are sent to a data processor 126, which continuously monitors the output signals to determine whether there is a change in the output signal from any one of the detectors 120.

The multiplexor 112 and demultiplexor 118 can be implemented with planar light circuit or thin film filter based technologies. In one example, the planar light circuit approach is used when there are more than 40 channels (i.e., more than 40 sensors 104 deployed at different locations in the protected area 132). In another example, thin film filter technology is used when less than 40 channels are required. The system 100 can be upgraded or expanded by adding additional sources 110, detectors 120, multiplexors 112, and demultiplexors 118.

The data processor 126 uses information from a database 128 that includes a table 134 having information about a mapping between the location of each sensor 104 (including location of the corresponding sensing fiber or fibers 108) and the wavelength used by the sensor 104. For example, when there is a change in the output signal from one of the detectors 120, where the return signal has a wavelength $\lambda_i$, the data processor 126 determines the location of the perturbed sensing fiber based on the table 134 is $(x_i, y_i)$, and shows a warning signal indicating on a display 130 that there is an intruder at the location $(x_i, y_i)$. The database 128 can also include a map of the area 132 being protected. The data processor 126 may show a marker on the map indicating the location or locations where intruders are detected.

The database 128 may be stored in a storage 131, such as a hard drive or an optical recording medium, and loaded into system memory 129 during use.

Because each sensor 104 provides a unique and independent signal, knowledge of the location of the sensor 104 implies knowledge of the position of the potential intruder. The resolution of the detection system 100 is related the size of the sensor area. For example, a sensor 104 may be able to generate measurable changes in the return signal when a pressure above a certain threshold is applied to the ground within an area 136 surrounding the sensing fiber 108. The size of area 136 may depend on how deep the sensing fiber 108 is buried, and on the condition of the soil surrounding the sensing fiber 108. By increasing the number of sensors 104 and increasing the density of sensor placement, the resolution of the perimeter detection system 100 can be increased. The lengths of the interconnecting cable 106 and sensing fibers 108 can be tailored to suit the requirements of the perimeter detection system 10.

The static or "DC" output of each sensor 104 will depend on temperature and on the particular deployment configuration. The data processor 126 can detect an intrusion event by detecting a dynamic change in the signals returned from the sensors 104. The changes due to environmental influences are filtered out to reduce the likelihood of false alarms due to, e.g., temperature variations.

The database 128 may include information about the pre-stored sensor output parameters under various conditions, such as bury depth of the sensing fiber, the soil type, the climatic condition, and the applied pressure. When the sensors 104 are deployed, information about deployment conditions, such as bury depth and soil type, can be entered into the database. The monitoring station 102 may receive information on daily weather conditions, such as temperature and the amount of rain or snow. The data processor 126, upon detecting a change in the output signal of a detector 120, may determine whether there is an intruder based on several factors, such as the pre-stored sensor output parameters, the deployment conditions, and the daily weather conditions. For example, thick snow may reduce the amount of stress induced in the sensing fiber resulting from a person stepping above the sensing fiber.

The sensitivity of the sensors 104 may be adjusted based on the type of objects to be detected. For example, two sensors may be simultaneously deployed at an area, in which one sensor having a lower sensitivity is used to detect heavier objects (such as vehicles), and another sensor having a higher sensitivity is used to detect lighter objects (such as humans). When the sensors are used in conjunction with perimeter fencing, false alarms due to wildlife can be reduced when the system 100 is installed inside the fence.

Figure 2:
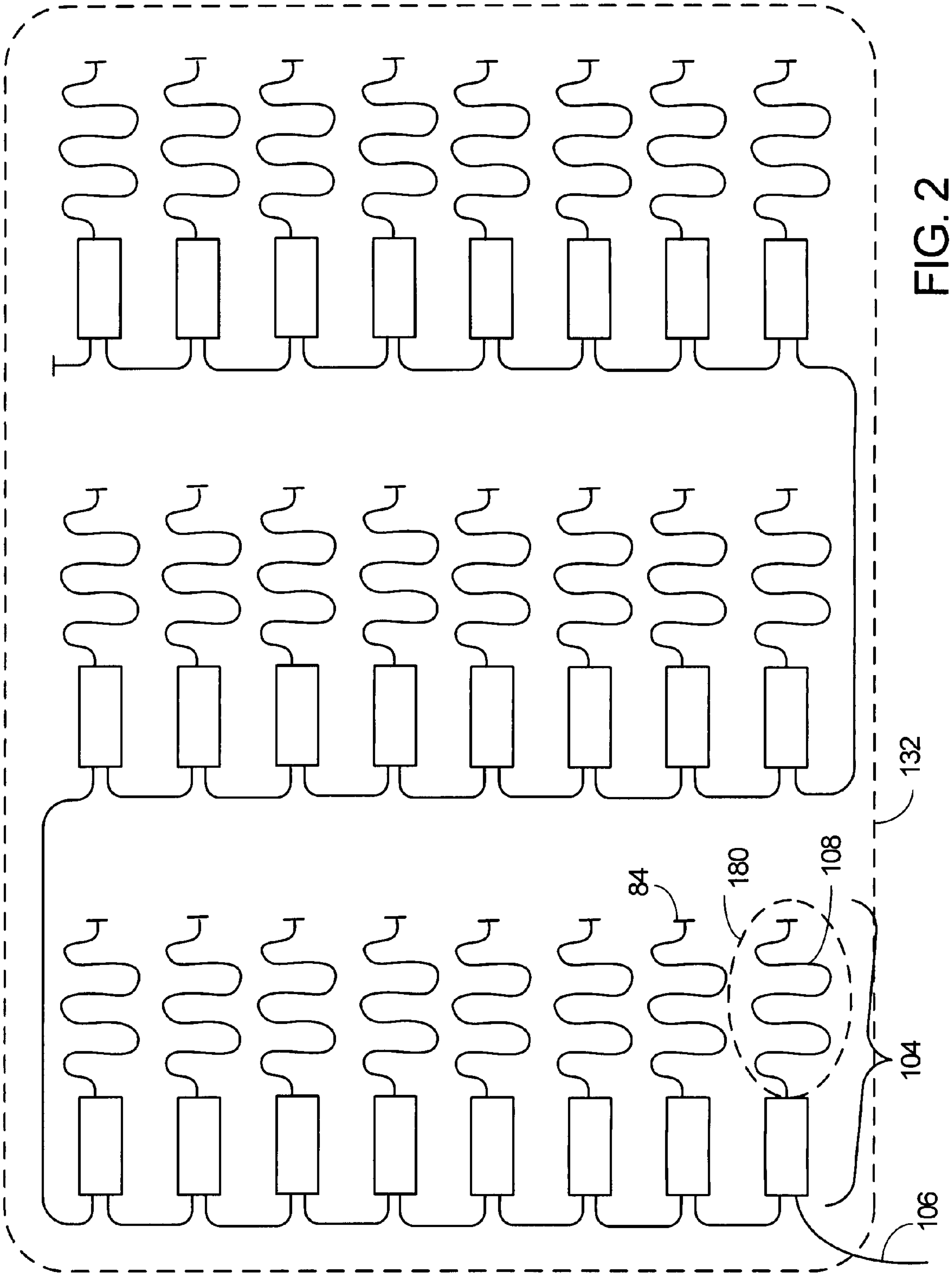
FIGS. 2 and 3 show fiber optic sensors deployed in different locations of a protected area.

FIG. 2 shows a configuration in which sensors 104 are deployed to provide sampled detection regions 180 in the area 132 to be monitored. For a large area to be monitored, with coarse position accuracy requirements, the separation between sensors 104 can be large. Finer position resolution requires more sensors 104 with shorter sensor fibers 108.

Figure 3:
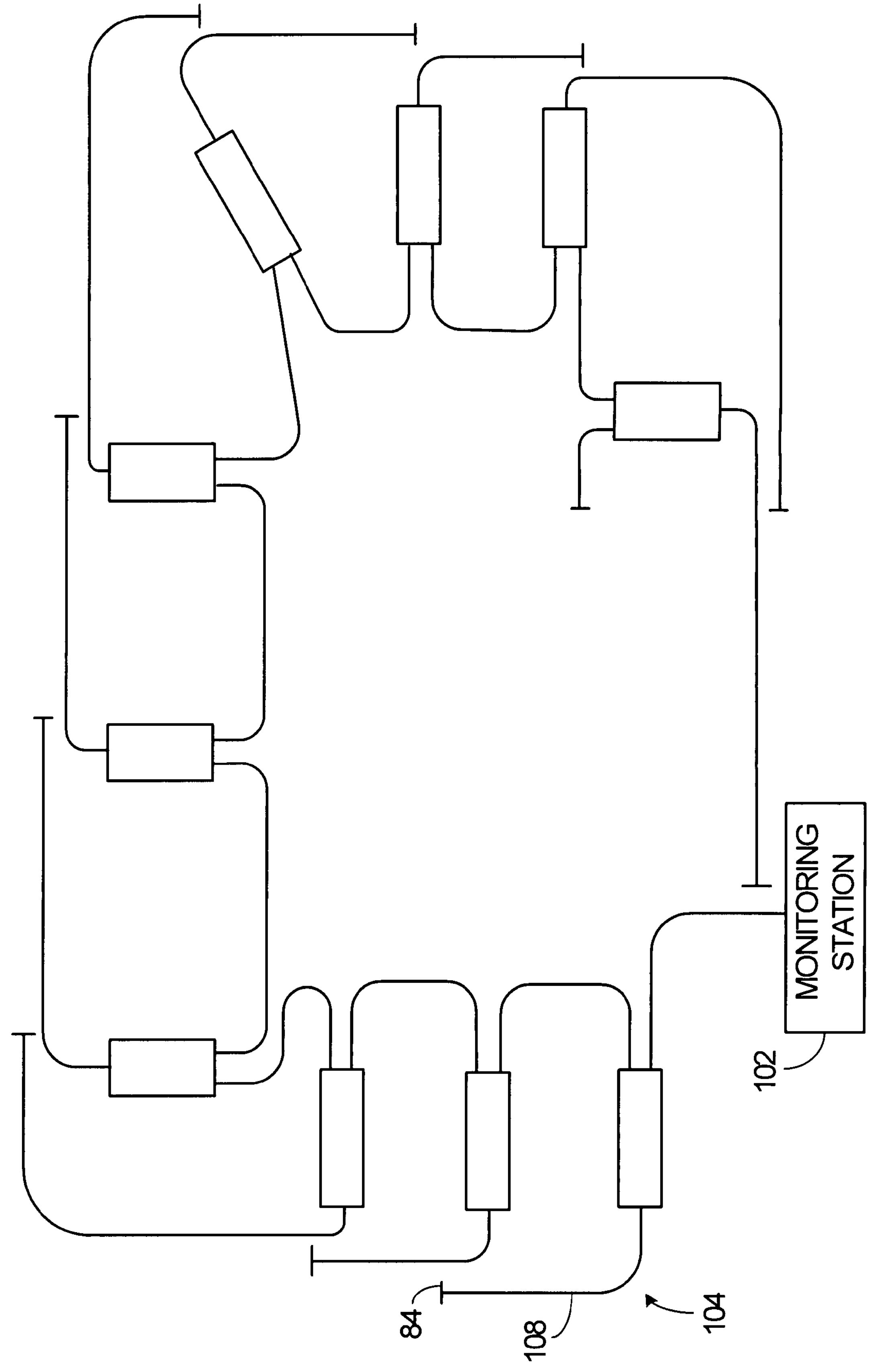

FIG. 3 shows a configuration in which sensors 104 are deployed to provide detection at the entire perimeter of an area to be protected. In this case, the sum of the lengths of the sensing fibers 108 is equal to or larger than the length of the perimeter.

Finer resolution may be achieved through multisensor techniques. For example, if a perturbation is detected by two sensors 104 that are positioned near each other, the system 100 may determine that the perturbation (or intruder) is located somewhere between the two sensors. If two sensors both detect a perturbation, and one sensor has a higher detection signal than the other, the system 100 can infer that the perturbation occurs at a location closer to the sensor having a higher detection signal.

In one example, after the sensors 104 are deployed in the area 132, the return signals from the sensors 104 are measured for perturbations that occur at different locations. For example, a person may stand at different locations in the area 132, such as $P_1$ to $P_5$, and the return signals from different sensors 104 are measured. The signal patterns from the different sensors are stored in the database 128. When the system 100 is later used to monitor the area 132, and a perturbation is detected by multiple sensors, the signal pattern from the multiple sensors is compared with stored signal patterns to provide an estimate of the location of the intruder. The database 128 may also store signal patterns representing return signal patterns when there are more than one intruder.

The following describes two types of sensors that use interferometric techniques to enhance the sensitivity of the sensor 104 in detecting perturbance to the sensing fiber 108. One sensor configuration is based on a Michelson interferometer, which measures relative phase change. The other sensor configuration is based on a Sagnac interferometer, which is sensitive to birefringence changes induced by stress on the sensing fiber.

Figure 4:
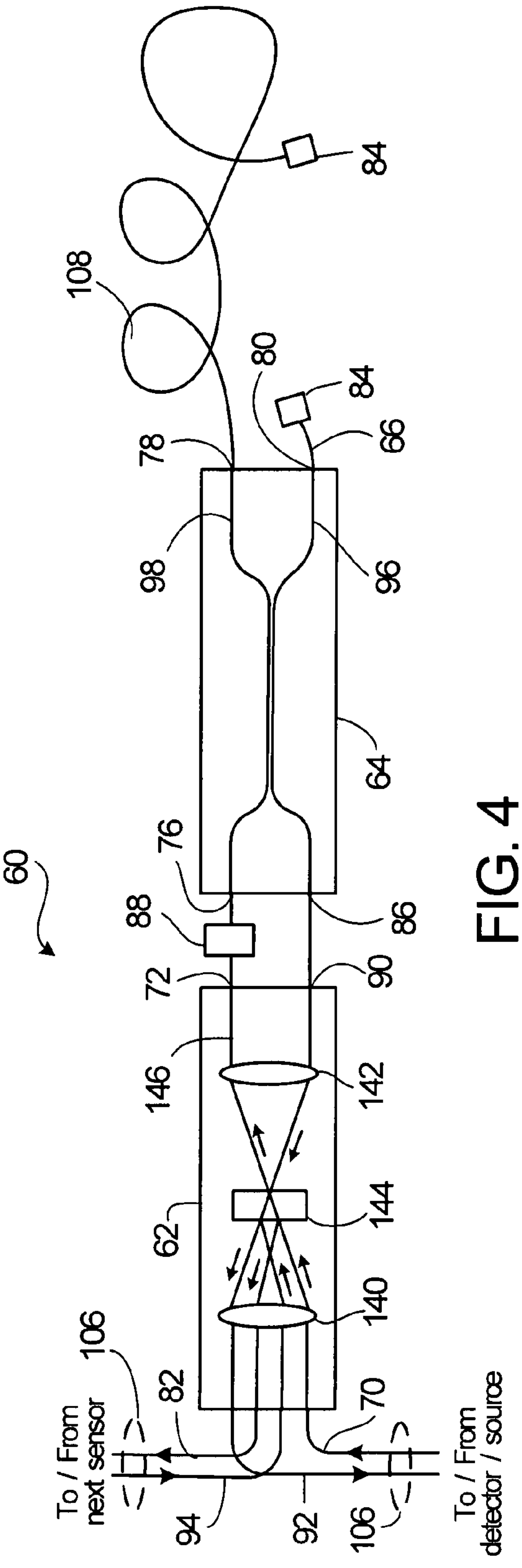
FIGS. 4 and 5 are schematic diagrams of fiber optic sensors.

FIG. 4 shows an example of a Michelson interferometer based fiber optic sensor 60, which measures relative phase changes induced by stress on the sensing fiber 108. The sensor 60 includes a 6-port DWDM filter 62, a 2-by-2 3 dB coupler 64, a reference fiber 66, and a sensing fiber 108. In the example in FIG. 4, the sensor 60 is coupled to the monitoring station 102, receives WDM signals from the monitoring station 102, and sends WDM signals to the monitoring station 102. Additional sensors are coupled downstream of the sensor 60 through the interconnect cable 106. Here, the "downstream" means farther away from the monitoring station 102, and "upstream" means closer to the monitoring station 102.

The DWDM filter 62 is a narrow-band filter that includes focusing lens 140 and 142, and a thin film filter 144. WDM signals sent from the DWDM multiplexer 112 (FIG. 1) are transmitted to the DWDM filter 62 through a fiber 70 (which is included in the interconnect cable 106). The WDM signals are focused by the lens 140 onto the thin film filter 144, which allows a narrow-band signal having a particular wavelength to pass. The narrow-band signal is focused by the lens 142 onto a fiber 146 and exits the DWDM filter 62 through a port 72. The remaining signals are reflected by the thin film filter 144, focused by the lens 140, and coupled to a fiber 82, which transmits the remaining signals to the next sensor 104.

The narrow-band signal at the port 72 is transmitted to a port 76 of the coupler 64 and split into two signals. One signal, referred to as the reference signal, travels along a reference path that includes the reference fiber 66. The other signal, referred to as the sensor signal, travels along a sensing path that includes the sensing fiber 108. The fibers 66 and 108 are coupled to Faraday rotator mirrors 84 to reflect the reference signal and the sensor signal, respectively. The Faraday rotator mirrors 84 also compensate for variations in the polarization states of the signals.

The reference fiber 66 is short, typically just long enough to connect to the Faraday rotator mirror 84, and is isolated from perturbations in the environment, providing a constant phase reference path. The sensing fiber 108 can be made arbitrarily long, depending on the resolution of the detection system 100. In one example, the sensing fiber 108 is an SMF-28 fiber, available from Corning Incorporated, Corning, N.Y.

The signals from the reference path and the sensing path interfere when they are reflected by the Faraday rotator mirrors 84 and coupled back into the coupler 64. Half of the interference signal is sent to the first input leg of the coupler 64 and exits at port 76, while the other half of the interference signal is sent to the second input leg and exits at port 86.

The interference signal exiting port 76 is not used. A fiber optic isolator 88 is provided between ports 72 and 76 to allow signals to travel from port 72 to port 76, but not in the reverse direction. This prevents the reflected signals from entering the DWDM filter 62, causing signal degradation and feed back problems. The interference signal exiting port 86 is transmitted to a port 90 of the DWDM filter 62, and is focused by the lens 142 onto the thin film filter 144. The interference signal passes the thin film filter 144, is focused by the lens 140, and is coupled to a fiber 92, forming the output signal of the sensor 60. The fiber 92 transmits the interference signal to the monitoring station 102. The interference signal is detected by one of the detectors 102.

Changes in the stress on the sensing fiber 108 induces a change in birefringence in the sensing fiber 108, resulting in a phase change in the sensing path. Because the reference fiber 66 is isolated from the environment, changes in the stress on the sensing fiber 108 results in a relative phase change between the reference signal and the sensor signal, thus producing a variation in the interference signal that is detected by the detector 120. The data processor 126 (FIG. 1) continuously monitors the output signals from the detectors 120, and can detect changes in the output signals, indicating changes in the sensor signal.

The DWDM filter 62 receives WDM interference signals, which are output signals from other sensors 104, through a fiber 94. The WDM interference signals are focused by the lens 140 onto the thin film filter 144, which reflects all of the WDM interference signals since they have wavelengths that are outside the pass band of the filter 144. The reflected WDM interference signals are focused by the lens 140 and coupled to the fiber 92 along with the interference signal from the coupler 64.

The lens 140 and 142 are each shown schematically as one lens in the figure. In one example, each port of the DWDM filter 62 is associated with a lens that focuses signals from or to fibers at the port.

Using the interferometric technique, a small amount of pressure applied to the sensing fiber 108 (e.g., caused by an intruder stepping on the sensing fiber) can be detected. The small amount of pressure induces a small amount of change in the birefringence of the sensing fiber 108, resulting in a change in the interference signal that can be detected by the data processor 126.

Additional sensors are coupled downstream of the sensor 60 through the interconnect cable 106. Each sensor downstream of the sensor 60 has a similar configuration, except that the WDM signals received from the fiber 70 includes fewer signals, as upstream sensors have dropped off narrow-band signals at different wavelengths.

Figure 5:
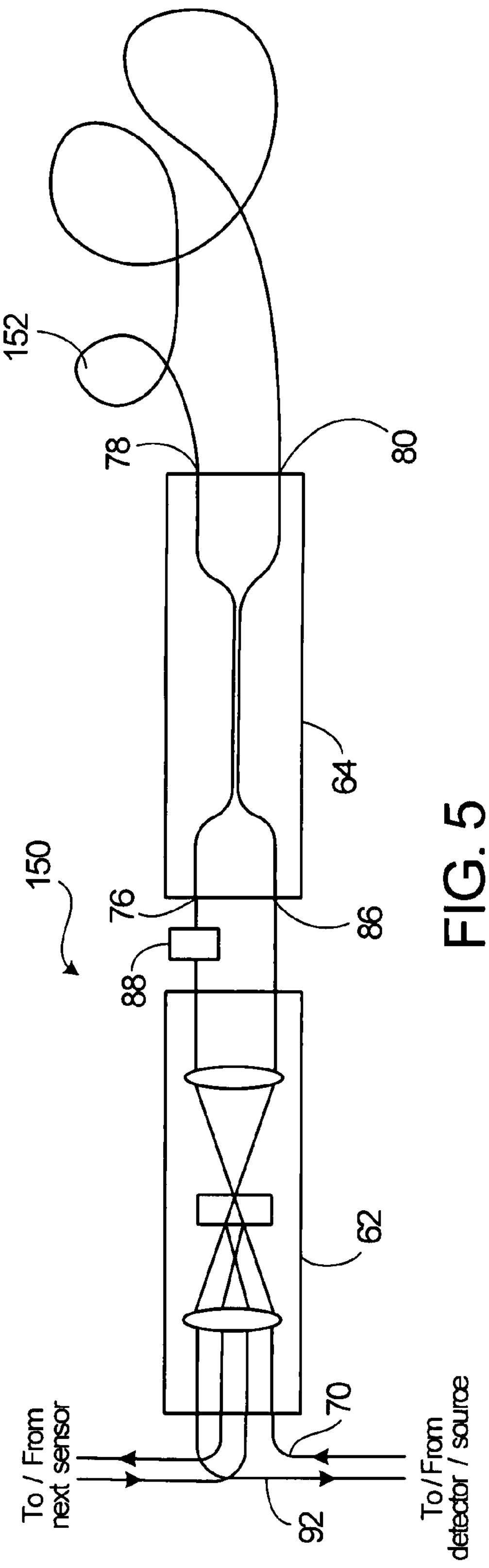

FIG. 5 shows an example of a Sagnac interferometer based fiber optic sensor 150, which is sensitive to birefringence changes induced by stress in the sensor fiber 108. Similar to sensor 60, the sensor 150 includes a 6-port narrow-band DWDM filter 62, a 2-by-2 3 dB coupler 64, and a sensing fiber 152 that has an arbitrary length. In one example, the sensing fiber 152 is an SMF-28 stress sensitive fiber. Unlike sensor 60, the sensor 150 does not have a reference fiber. Rather, the two ends of the sensing fiber 152 are coupled to ports 78 and 80 of the coupler 64, forming a sensing fiber loop.

A narrow-band signal that is dropped off by the DWDM filter 62 enters the coupler 64 through port 76 and is split into two signals. The two signals exit the coupler 64 at ports 78 and 80, travel along the sensing fiber 152 in opposite directions, and return to the coupler 64 through ports 80 and 78, respectively.

When there is no stress on the sensing fiber 108, the sensing fiber 108 functions as a loop mirror such that the two signals returning to the coupler 64 at ports 78 and 80 destructively interfere at port 86 and constructively interfere at port 76. As a result, the narrow-band signal entering port 76 is returned to port 76, and no signal appears at port 86.

When stress is applied to the sensing fiber 152, a change in the birefringence in the fiber 152 will partially disrupt the interference of the two signals returning to the coupler 64 at ports 78 and 80, resulting in an interference signal at port 86. The interference signal is coupled to the fiber 92 and returned to the monitoring station 102.

The DWDM filter 62 and the 3 dB coupler 64 are based on standard telecommunications components, so the sensors 60 and 150 can be built at a low cost with high reliability. An example of the DWDM filter 62 is PowerFilter™, from Avanex Corporation, located at Fremont, Calif. The 6-port DWDM filter 62 combines both multiplexing (combining the interference signals onto fiber 92) and demultiplexing (dropping a narrow-band signal from the WDM signals received from fiber 70) functionality in one device. The package for a typical DWDM filter 62 or the coupler 64 is cylindrical, having a cross section that is less than 5 mm and a length that is less than 45 mm. The small sizes of the filter 62 and coupler 64 allow the sensors 60 and 150 to be easily hidden when deployed in the field. The sensing fiber 108 has a diameter of approximately 1 to 3 mm. The filter 62, the coupler 64, and the fiber 108 can be coated, painted, or enclosed in appropriate colored packaging for camouflage.

Figure 6A:
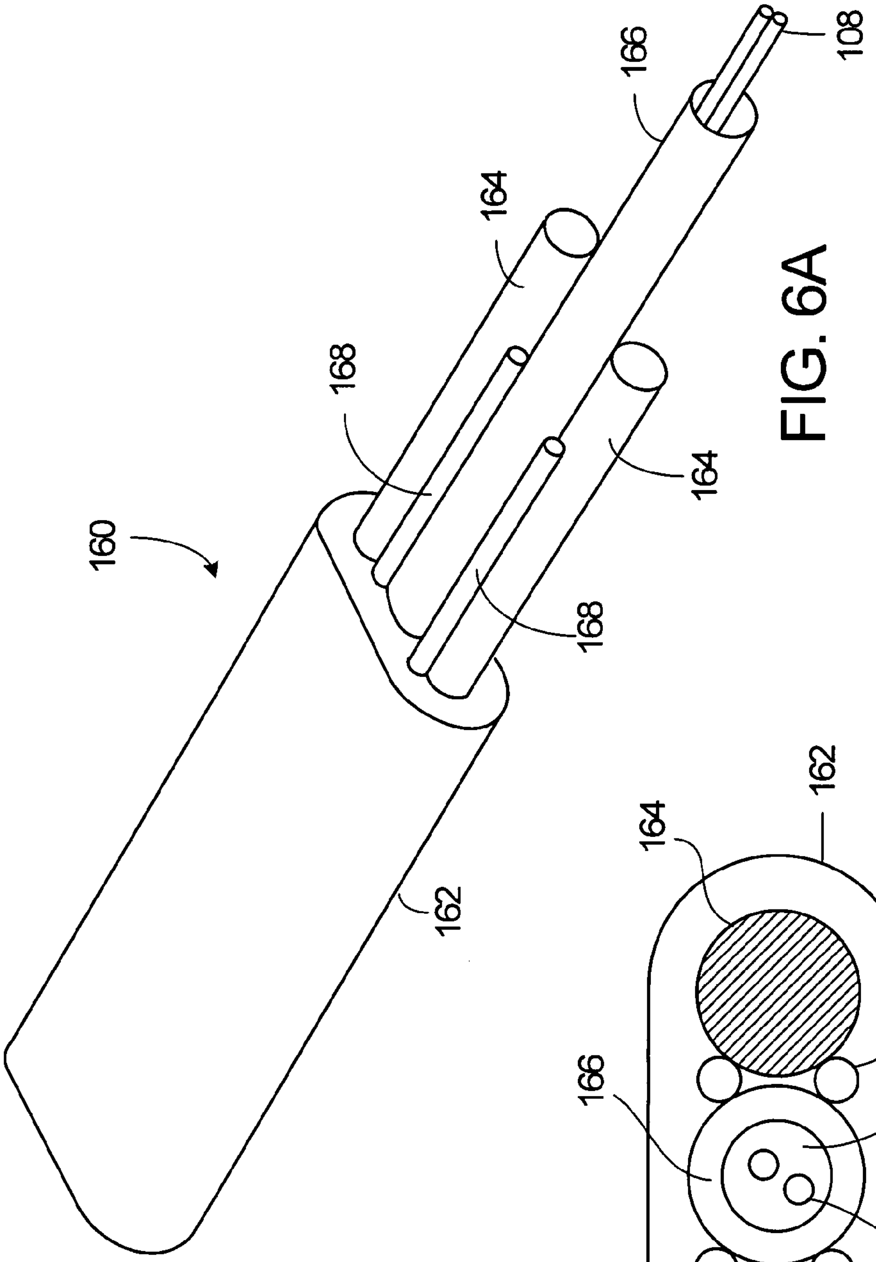
FIGS. 6A and 6B show drop fiber cables.
Figure 6B:
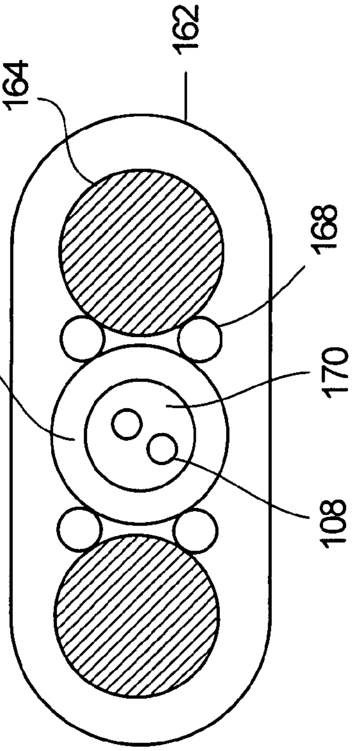

FIGS. 6A and 6B show an example of a drop cable 160 that includes the sensing fiber 108. The drop cable 160 can be, e.g., SST-Drop Dielectric Cable with SMF-28 optical fiber, available from Corning Incorporated, Corning, N.Y. The drop cable 160 is used in telecommunications applications, and are designed to last several years in a relatively harsh environment. The drop cable 160 includes strength members and protective jacketing for crush resistance, and water blocking/absorbing compounds. The sensing fiber 108 is enclosed in a buffer tube 166, which is supported by dielectric strength members 164. Filling compound 170 fills the space between the fiber 108 and the tube 166. A polyethylene (PE) outer jacket 162 provides protection from wear and tear. Water-swellable fiberglass 168 swells upon contact with water to prevent water penetration.

The degree of protection that is required for the sensing fiber 108 depends on the requirements for a given application. If the sensors 104 need to be temporarily deployed in the field and then discarded after a few days or weeks, the sensors 104 can use inexpensive fiber cable with limited protection. For permanent installations, such as in some of the homeland security applications, more sophisticated and higher reliability cabling can be used. The fiber cable used for the sensing fiber is selected to achieve a balance between mechanical protection and sensor sensitivity.

The detection system 100 is based on telecommunications technology, and is scalable to a large number of channels and a large detection area. Commercially available DWDM components can have more than 150 channels, and the signals can travel in fibers several kilometers long. One factor that limits the reach of the system 100 is the insertion loss at each sensor 104, which may add a fraction of a dB of loss. Extending the reach of the system 100 can be achieved by deploying optical amplifiers in the field and/or limiting the number of sensors on one chain. Deploying optical amplifiers in the field may allow the sensors to be more easily detected, and may also require local power supply. By limiting the number of sensors on one chain, the insertion loss can be reduced.

Figure 7:
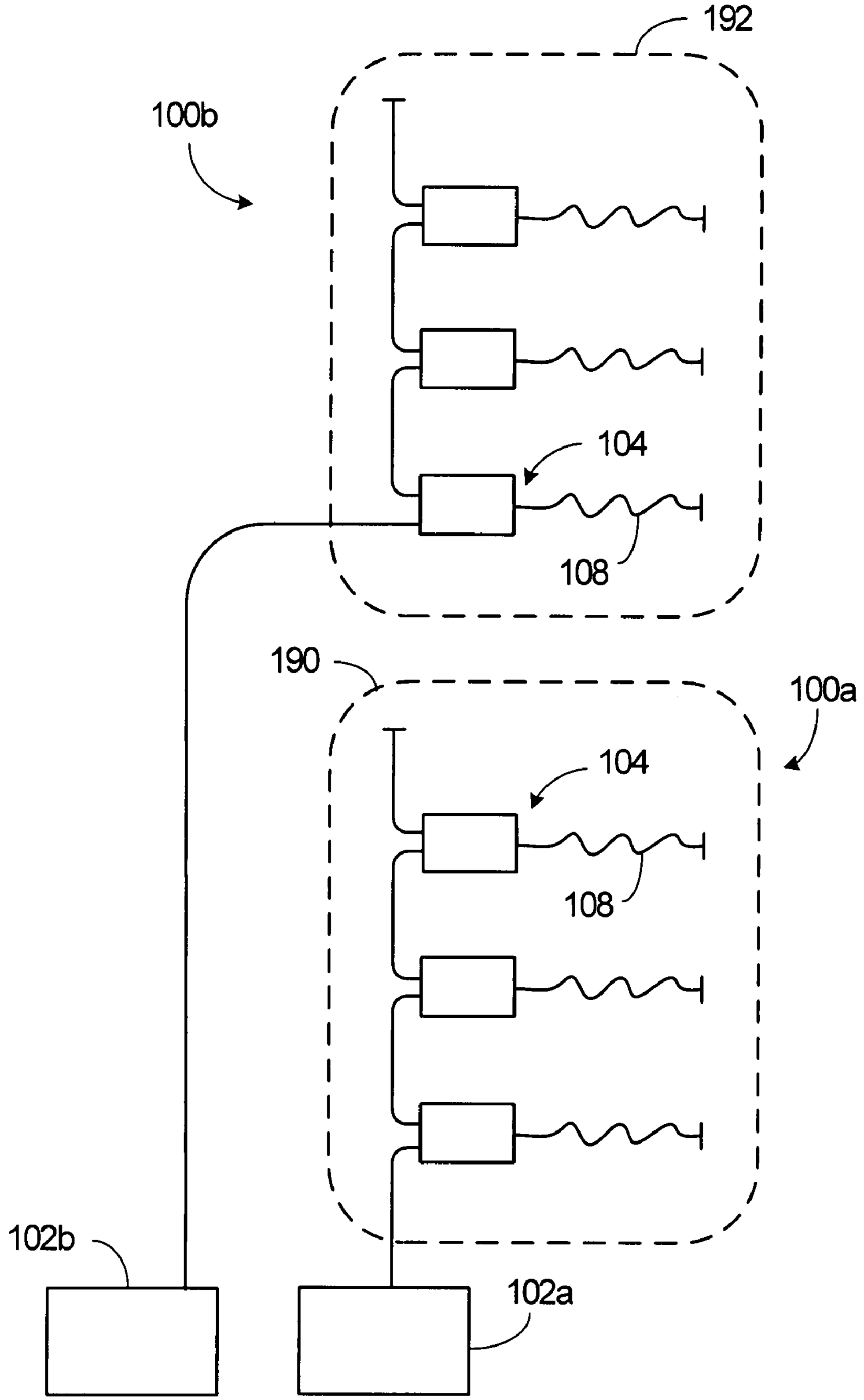
FIG. 7 show perimeter detection systems.

FIG. 7 shows a system 100*a* that serves a local area 190, and a system 100*b* that serves a remote area 192. A monitoring station 102*a* monitors the return signals from sensors 104 that are deployed at the local area 190. A monitoring station 102*b* monitors the return signals from sensors 104 that are deployed at the remote area 192. Additional systems 100 can be deployed to monitor areas that are farther from the monitoring station 102. The interconnect fiber 106 has a low loss, so deploying the sensors 104 at remote locations will not cause much degradation in the return signals from the sensors 104. A few kilometers of fiber can be added to the front of a chain of sensors with a loss penalty less than a few dB.

The system 100 is compatible with the installation and maintenance tools of the telecommunications industry. For example, optical time domain reflectometry (OTDR) can be used to detect fault locations, and repairs can be made using standard cable repair techniques.

The fiber optic perimeter detection system 100 can be customized based upon the length of the perimeter of the area to be protected, the number of sensors that are deployed, the size of the individual sensing grids, the local soil conditions, and sensitivity of the receiver system. The sensitivities of the sensors 104 can be customized to adapt to different soil and weather conditions, both at installation and over the course of a year. For example, the perimeters of Alaskan airbases may have frozen tundra soils, whereas airbases in the desert may be surrounded by sand having a temperature up to 150° F. In one example, the sensitivity of the sensing fiber is configured to allow the fiber to be buried in standard 18- to 24-inch trenches. The sensors 104 may be configured based on information about how much pressure is transferred through a particular type of soil to the fiber. The sensors can be temporarily deployed under snow, leaves, sand, and/or loose dirt.

Deployment of the sensors 104 and the interconnect fiber cables 106 at airfields may use technology used to install and monitor airfield lighting systems. For example, trenches around the perimeter of runways that are used to install the runway edge lights can be used to deploy the sensors 104 (including the sensing fibers 108) and the interconnect fiber cables 106. Systems for monitoring and reporting the status of the airfield lights (often numbered in the thousands) can be configured to monitor the signals from the sensors 104. Each of these centralized systems for monitoring airfield lights is customized for a particular airfield, and can be adapted for deployment of the perimeter detection system 100.

Features and advantages of the fiber optic perimeter detection system 100 include the following. The sensors and cables are passive elements, with little or no light escaping the fibers, so there are no probes that an intruder can use to detect the system 100. The components used in the design of the sensors and relay optics are made of glass and organic materials, making them undetectable by metal detectors. Communication of detection events is achieved by relaying the information along SMF-28 optical fiber that interconnects the sensors 104, making it difficult for an intruder to detect the sensor communication and detection signals. There are little or no detectable radio frequency or heat signatures. By deploying multiple sensors in the field, and mapping the locations of the sensors with the wavelengths used by the sensors, the system 100 can determine the location of an intruder based on detected signal variations at particular wavelengths. The sensors 104 are based on low cost interferometry components and commercially available DWDM optical communications technology. Remote monitoring of a site (up to several kilometers away) can be achieved by adding a long section of optical cable at the front of a chain of sensors.

A number of embodiments of the invention have been described. Nevertheless, it will be understood that various modifications may be made without departing from the spirit and scope of the invention. For example, each wavelength can be mapped to more than one location. Each location can have sensing fibers from two or more fiber optic sensors. An intruder trespassing a region would trigger the two or more fiber optic sensors. The combination of signals from the two or more sensors can be used to determine whether there is an intruder. This also provides redundancy so that if one sensor fails, the other sensors can continue to monitor the location.

Polarization maintaining fibers, or PANDA fibers, can be used as the stress sensing fiber 108. PANDA fiber maintains polarization state and can increase the fiber optic sensor's sensitivity range when a change in stress is applied, and can reduce some of the potentially negative effects of fiber birefringence.

FIGS. 2 and 3 show detection systems using fiber optic sensors having sensing fibers coupled to reflecting elements at their ends. Sensor configurations that do not use reflective elements, such as Sagnac interferometer based fiber optic sensors, can also be used in those systems.

Each sensor 104 may have more than one sensing fiber 108. The interference signal generated by a sensor 104 may be based on an interference of more than two signals. The coupler 64 may couple more than two signals, so that signals traveling more than two signal paths can be coupled to generate the interference signal.

Accordingly, other embodiments are within the scope of the following claims.

What is claimed is:

1. An apparatus comprising:

fiber optic sensors positioned at different regions, each fiber optic sensor comprising:
- a sensing fiber, and
- a wavelength division multiplexing filter to receive wavelength division multiplexed signals intended for multiple fiber optic sensors, allow one of the light signals having a specific wavelength to pass to the sensing fiber and prevent light signals intended for other fiber optic sensors from passing to the sensing fiber,
- each fiber optic sensor generating an output light signal having the specific wavelength, the output light signal having a property that varies when stress is induced in the sensing fiber, wherein the wavelength division multiplexing filter multiplexes the output light signal from the fiber optic sensor with output light signals from other fiber optic sensors to generate wavelength division multiplexed output light signals;

a receiver to receive the wavelength division multiplexed output light signals; and a memory to store information related to a mapping between the wavelengths of the output light signals and the regions where the fiber optic sensors are positioned.

2. The apparatus of claim 1, further comprising a transmitter to transmit light signals having multiple wavelengths to the fiber optic sensors.

3. The apparatus of claim 1, further comprising a display to indicate a particular region when there is a change in an output light signal having a wavelength that maps to the particular region.

4. The apparatus of claim 1 in which at least one region has sensing fibers of at least two fiber optic sensors, and the memory stores information related to a mapping between the region and at least two wavelengths that correspond to the at least two fiber optic sensors.

5. The apparatus of claim 1 in which the fiber optic sensor senses pressure applied to the sensing fiber.

6. The apparatus of claim 1 in which the output light signal of each of at least a subset of the fiber optic sensors comprises an interference signal based on an interference of light signals, at least one of the light signals on which the interference signal is based being transmitted through the sensing fiber.

7. The apparatus of claim 6 in which the sensing fiber is coupled to a reflector.

8. The apparatus of claim 6 in which the interference signal is based on an interference of light signals entering and exiting opposing ends of the sensing fiber.

9. The apparatus of claim 1, further comprising one or more fiber cables to transmit the light signals from the transmitter to the fiber optic sensors and to transmit the output light signals from the fiber optic sensors to the receiver.

10. The apparatus of claim 1 in which the property comprises at least one of a phase and an amplitude of the output light signal.

11. A perimeter sensing apparatus comprising:

a fiber optic sensor for coupling to a fiber interconnect cable, the fiber optic sensor comprising a reference fiber, a sensing fiber, and a filter, the fiber optic sensor generating an interference signal based on a reference signal and a sensing signal, the reference signal traversing the reference fiber and does not traverse the sensing fiber, the sensing signal traversing the sensing fiber and does not traverse the reference fiber, the interference signal varying in phase and/or amplitude when stress is induced in the sensing fiber, wherein the filter receives light signals intended for multiple fiber optic sensors from an upstream segment of the fiber interconnect cable, allows one of the light signals having a specific wavelength to pass to the reference fiber and the sensing fiber, and reflects the light signals intended for other fiber optic sensors to a downstream segment of the fiber interconnected cable;

a detector to detect the interference signal; and a data processor to detect changes in the interference signal.

12. A perimeter sensing apparatus comprising:

fiber optic sensors each comprising:

a sensing fiber loop, and a filter to allow an input light signal having a specific wavelength to pass to the sensing fiber loop and prevent light signals intended for other fiber optic sensors from passing to the sensing fiber loop, the fiber optic sensor generating an interference signal based on an interference of two signals split from the input light signal, the two signals traveling the sensing fiber loop in opposite directions, the interference signal varying in phase and/or amplitude when stress is induced in the sensing fiber loop;

a detector to detect the interference signal; and a data processor to detect changes in the interference signal.

13. The apparatus of claim 12, further comprising a coupler that splits the input signal into the two signals traveling the sensing fiber loop in opposite directions.

14. A perimeter sensing system comprising:

a fiber interconnect cable; and fiber optic sensors positioned at different regions and connected by the fiber interconnect cable, each fiber optic sensor comprising:

a sensing fiber that branches off the fiber interconnect cable, and a filter to receive light signals intended for multiple fiber optic sensors from an upstream segment of the fiber interconnect cable, allow a light signal having a specific wavelength to pass to the sensing fiber, prevent light signals intended for other fiber optic sensors from passing to the sensing fiber, and reflect the light signals intended for other fiber optic sensors to a downstream segment of the fiber interconnected cable, each fiber optic sensor generating an output light signal having the specific wavelength, the output light signal having a property that varies when stress is induced in the sensing fiber.

15. The system of claim 14 in which the output light signal of each of at least a subset of the fiber optic sensors comprises an interference signal based on an interference of light signals, at least one light signal being transmitted through the sensing fiber.

16. The system of claim 14, further comprising fiber cables to transmit light signals from a transmitter to one of the fiber optic sensors, from the fiber optic sensors to a receiver, and from one fiber optic sensor to another fiber optic sensor.

17. The system of claim 16 in which the property comprises at least one of a phase and an amplitude of the output light signal.

18. The system of claim 14, further comprising a transmitter to transmit light signals having multiple wavelengths to the fiber optic sensors.

19. The system of claim 14, further comprising a receiver to receive the output light signals from the fiber optic sensors.

20. The system of claim 14, further comprising a memory to store information related to a mapping between the wavelengths of the output light signals and the regions where the fiber optic sensors are positioned.

21. The system of claim 20, further comprising a display to indicate a change in the one or more conditions in a particular region when there is a change in an output light signal having a wavelength that maps to the particular region.

22. The system of claim 14 wherein each sensing fiber has a free end not coupled to another fiber.

23. The system of claim 22 wherein the free end of the sensing fiber is coupled to a Faraday rotator mirror.

24. The system of claim 14 wherein each of the filters comprises a first port for receiving light signals from an upstream segment of the fiber interconnect cable, a second port for sending light signals to the upstream segment of the fiber interconnect cable, a third port for sending light signals to a downstream segment of the fiber interconnect cable, and a fourth port for receiving light signals from the downstream segment of the fiber interconnect cable.

25. The system of claim 14 wherein each of the filters comprises a first port for sending light signals to the sensing fiber and a second port for receiving light signals from the sensing fiber.

26. A method comprising:

at a filter of a fiber optic sensor coupled to a fiber interconnect cable, receiving light signals intended for multiple fiber optic sensors from an upstream segment of the fiber interconnect cable, passing one of the light signals having a specific wavelength, and reflecting the light signals intended for other fiber optic sensors to a downstream segment of the fiber interconnected cable;

generating an interference signal based on a reference signal and a sensor signal that are derived from the light signal that passed the filter, the reference signal traveling a reference fiber that is insensitive to changes in an environment, the sensor signal traveling a sensing fiber that is sensitive to changes in the region, in which the reference signal does not travel through the sensing fiber and the sensor signal does not travel through the reference fiber;

detecting the interference signal; and detecting changes in the interference signal.

27. The method of claim 26, further comprising transmitting light signals having multiple wavelengths to a fiber optic sensor that comprises the reference fiber and the sensing fiber.

28. The method of claim 27, further comprising, at the fiber optic sensor, filtering the light signals to allow a light signal having a specified wavelength to pass and to reflect the other light signals.

29. The method of claim 26 in which the interference signal varies in phase and/or amplitude when stress is induced in the sensing fiber.

30. A method of monitoring a region using a plurality of sensing fiber loops, comprising:

for each sensing fiber loop, filtering light signals having multiple wavelengths to allow an input signal having a specific wavelength to pass to the sensing fiber loop and prevent light signals intended for other sensing fiber loops from passing to the sensing fiber loop;

generating an interference signal based on an interference between two signals split from the input signal, the two signals traveling along the sensing fiber loop in opposite directions, the sensing fiber loop being positioned at the region, the interference signal varying in phase and/or amplitude when stress is induced in the sensing fiber loop;

detecting the interference signals from the sensing fiber loops; and detecting changes in the interference signals.

31. The method of claim 30, further comprising splitting the input signal into the two signals, and directing the two signals to travel in opposite directions in the sensing fiber loop.

32. A perimeter monitoring method comprising:

sensing one or more conditions using fiber optic sensors that are positioned at different regions, each fiber optic sensor including a sensing fiber and a filter, the filter allowing a light signal having a specific wavelength to pass to the sensing fiber, the fiber optic sensor generating an output light signal having the specified wavelength, the output light signal varying when stress is induced in the sensing fiber, the filter passing corresponding light signals having a corresponding wavelength such that each sensing fiber receives light signals having the corresponding wavelength and not receive light signals intended for other sensing fibers, wherein the output light signal comprises an interference signal generated based on an interference of light signals, at least one of the light signals being transmitted through the sensing fiber;

receiving the output light signals from the fiber optic sensors; and monitoring the one or more conditions at the different regions based on the output signals from the fiber optic sensors and on information related to a mapping between the wavelengths of the output light signals and the regions where the fiber optic sensors are positioned.

33. The method of claim 32 in which generating the interference signal comprises overlapping a reference light signal and the light signal transmitted through the sensing fiber.

34. The method of claim 32 in which generating the interference signal comprises sending light signals into the sensing fiber through opposing ends of the fiber.

35. The method of claim 32 in which sensing one or more conditions comprises sensing pressure applied to the sensing fiber.

36. The method of claim 32, further comprising transmitting light signals having multiple wavelengths to the fiber optic sensors.

37. The method of claim 32, further comprising determining, based on output signals from a first fiber optic sensor positioned at a first location and a second fiber optic sensor positioned at a second location, that a perturbation has occurred at a location in a vicinity of the first and second locations.

38. The method of claim 37, further comprising determining whether the perturbation occurred closer to the first region or the second region based on relative strengths of the detection signals from the first and second fiber optic sensors.

39. A method comprising:

deploying multiple fiber optic sensors in an area, each of the fiber optic sensors including a filter and a sensing fiber that is sensitive to stress applied to a region within the area, the filter allowing only light signals having a particular wavelength to be coupled to the sensing fiber to allow that sensor to generate an output signal having the particular wavelength, the output signal having a property that changes in response to stress induced in the sensing fiber, the filters in different sensors allowing light signals having different wavelengths to pass to corresponding sensing fibers;

wherein for each of at least some of the fiber optic sensors, the sensing fiber forms a loop and the fiber optic sensor generates an interference signal based on an interference between two signals propagating in opposite directions through the sensing fiber.

40. The method of claim 39, further comprising linking the fiber optic sensors using transmit interconnect fibers and receive interconnect fibers, the transmit interconnect fibers sending wavelength division multiplexed signals to each of at least a subset of the sensors, the receive interconnect fibers receiving wavelength division multiplexed signals from each of at least a subset of the sensors.

41. The method of claim 39, in which each of at least some of the fiber optic sensors includes a reference fiber that is insensitive to the stress applied to a corresponding region.

42. A perimeter sensing system comprising:

a fiber interconnect cable; and fiber optic sensors positioned at different regions and connected by the fiber interconnect cable, each fiber optic sensor comprising:

a sensing fiber that branches off the fiber interconnect cable, each sensing fiber having a free end not coupled to another fiber, the free end of the sensing fiber being coupled to a Faraday rotator mirror, and a filter to allow a light signal having a specific wavelength to pass to the sensing fiber and prevent light signals intended for other fiber optic sensors from passing to the sensing fiber, each fiber optic sensor generating an output light signal having the specific wavelength, the output light signal having a property that varies when stress is induced in the sensing fiber.

43. A perimeter sensing system comprising:

a fiber interconnect cable; and fiber optic sensors positioned at different regions and connected by the fiber interconnect cable, each fiber optic sensor comprising:

a sensing fiber that branches off the fiber interconnect cable, and a filter to allow a light signal having a specific wavelength to pass to the sensing fiber and prevent light signals intended for other fiber optic sensors from passing to the sensing fiber, each fiber optic sensor generating an output light signal having the specific wavelength, the output light signal having a property that varies when stress is induced in the sensing fiber;

wherein each of the filters comprises a first port for receiving light signals from an upstream segment of the fiber interconnect cable, a second port for sending light signals to the upstream segment of the fiber interconnect cable, a third port for sending light signals to a downstream segment of the fiber interconnect cable, and a fourth port for receiving light signals from the downstream segment of the fiber interconnect cable.

* * * * *

UNITED STATES PATENT AND TRADEMARK OFFICE

CERTIFICATE OF CORRECTION

PATENT NO. : 7,488,929 B2 
APPLICATION NO. : 10/918807
DATED : February 10, 2009
INVENTOR(S) : Paul A. Townley-Smith et al.

It is certified that error appears in the above-identified patent and that said Letters Patent is hereby corrected as shown below:

Column 14
Line 28, in claim 17, delete "claim 16" and insert --claim 14--

Signed and Sealed this

Twenty-fourth Day of March, 2009

JOHN DOLL
*Acting Director of the United States Patent and Trademark Office*